No. 883,779. PATENTED APR. 7, 1908.
H. M. BROOKFIELD.
GLASS FURNACE AND APPURTENANCES THEREOF.
APPLICATION FILED DEC. 28, 1903.
3 SHEETS—SHEET 1.
Fig. 1,
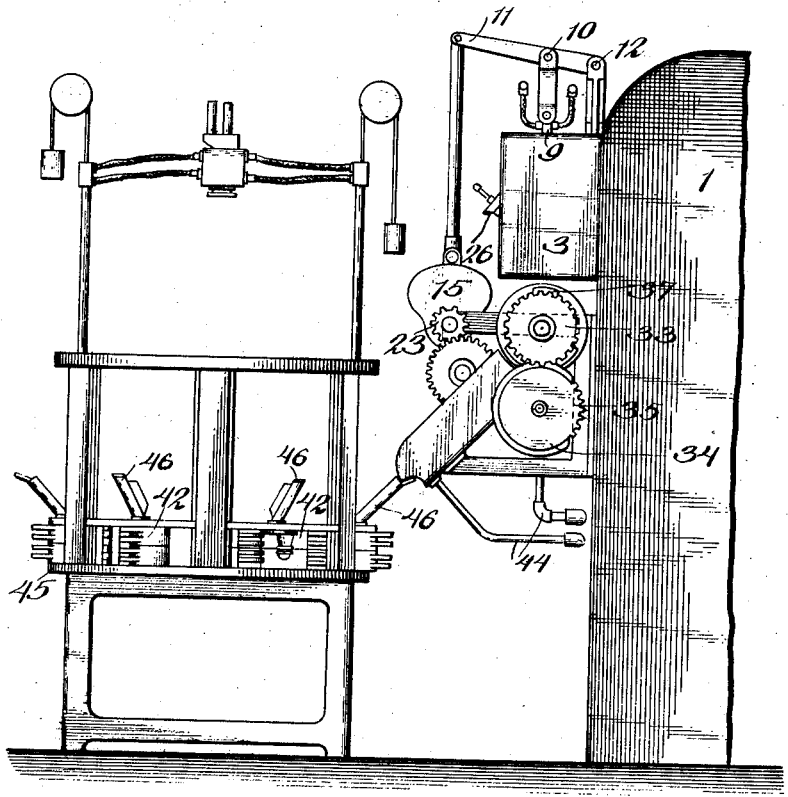
WITNESSES:
John C. Gempler.
Geo. M. Harris.
INVENTOR
Henry M. Brookfield
BY
Kenyon & Kenyon
ATTORNEYS

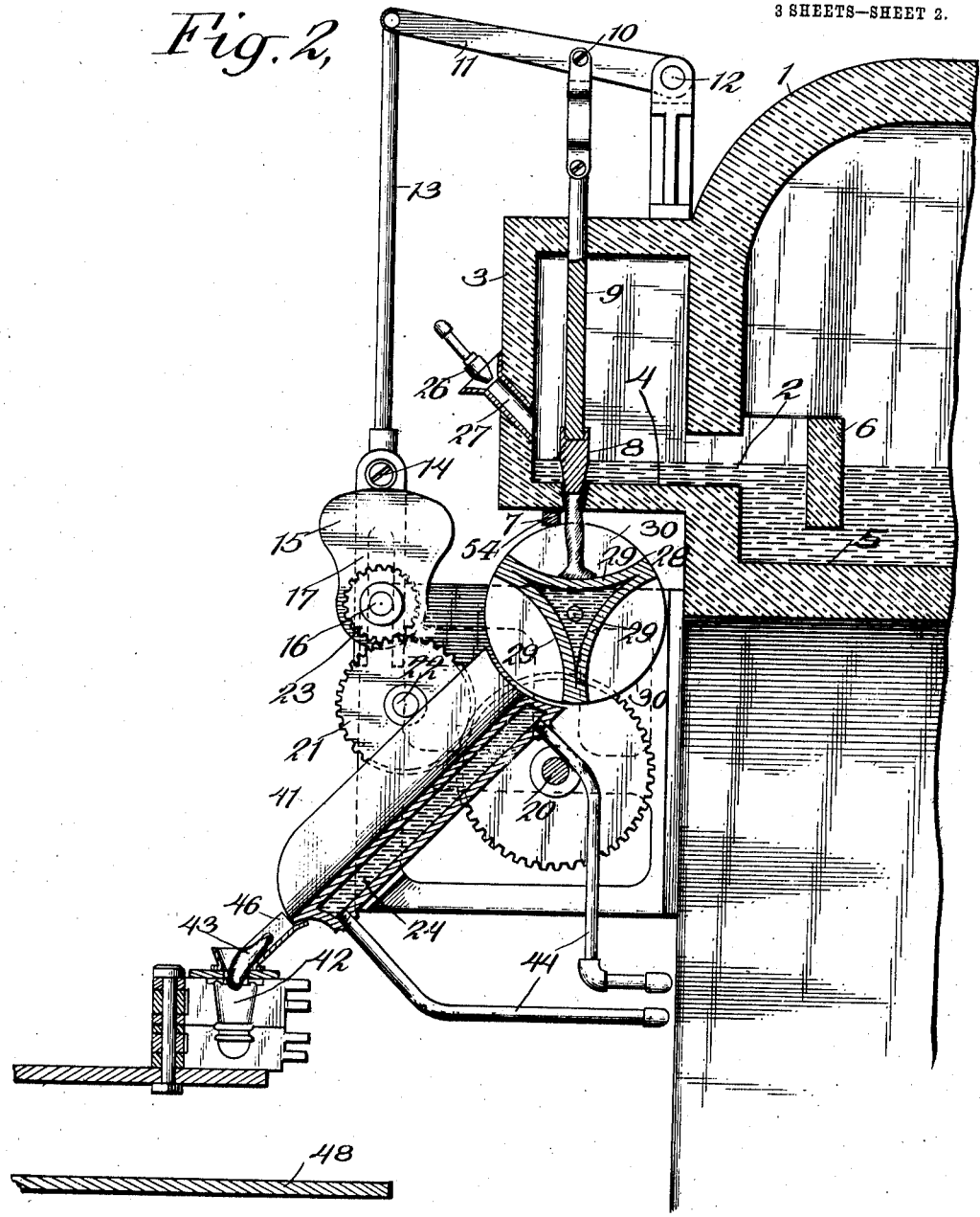

No. 883,779. PATENTED APR. 7, 1908.
H. M. BROOKFIELD.
GLASS FURNACE AND APPURTENANCES THEREOF.
APPLICATION FILED DEC. 28, 1903.
3 SHEETS—SHEET 3.
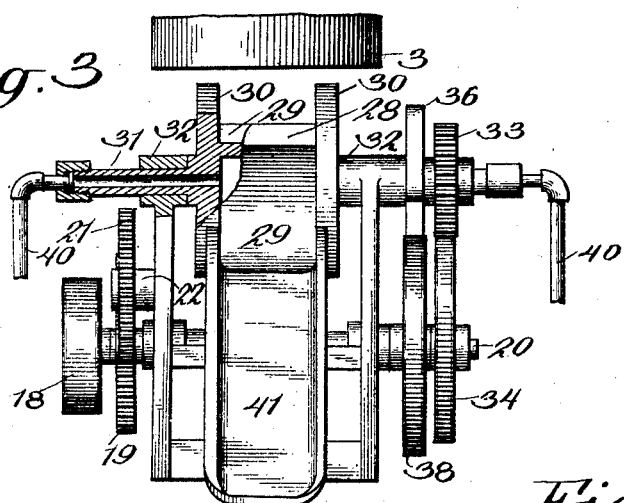
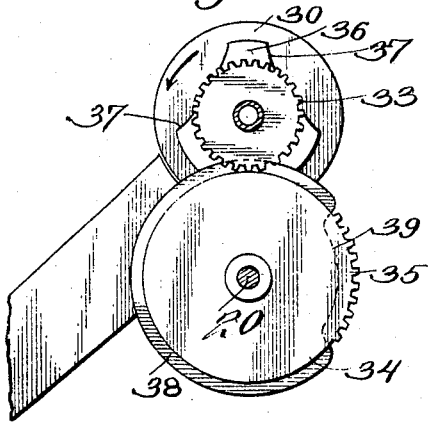
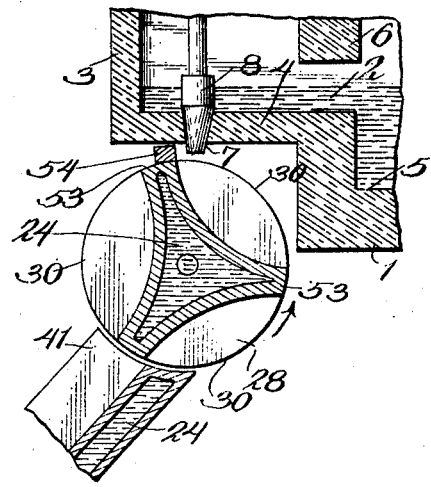
WITNESSES:
INVENTOR
Henry M. Brookfield
BY
Kenyon & Kenyon
ATTORNEYS

UNITED STATES PATENT OFFICE.

HENRY M. BROOKFIELD, OF NEW YORK, N. Y., ASSIGNOR TO BROOKFIELD GLASS COMPANY, A CORPORATION OF NEW YORK.

GLASS-FURNACE AND APPURTENANCES THEREOF.

No. 883,779.      Specification of Letters Patent.      Patented April 7, 1908.

Original application filed November 15, 1901, Serial No. 82,368. Divided and this application filed December 28, 1903. Serial No. 186,768.

*To all whom it may concern:*

Be it known that I, HENRY M. BROOKFIELD, a citizen of the United States, and a resident of the city, county, and State of New York, have invented certain new and useful Improvements in Glass-Furnaces and Appurtenances Thereof, of which the following is a specification.

My invention relates to glass furnaces and to means for feeding the molten glass therefrom. Its object is to make the operation of such devices automatic, to provide devices for automatically feeding molten glass from the furnace, to render such feeding certain and accurate, and to provide means for adjusting such feeding devices to vary the amount of feed as required; also to automatically measure the glass. It consists of the novel devices and combinations herein shown and described.

I have shown my improvement in connection with a press for making glass insulators although it is obvious that it may be employed with other apparatus and for other purposes.

In the drawings accompanying this specification and forming part hereof, I have shown and will now proceed to describe my improvement as embodied in its preferred form in connection with a press for making glass insulators.

In such drawings Figure 1 represents a side elevation of my improved devices in their preferred forms shown in connection with a press for making insulators, many of the parts of the press, having no direct connection with my improvement, being omitted merely for the sake of clearness and the furnace being shown only in part; Fig. 2 is a longitudinal section through a part of the furnace showing my improved devices for feeding, measuring, and delivering the molten glass from the furnace; Fig. 3 is a front view partly in section of a part of the said feeding, measuring, and delivering devices; Fig. 4 is a detail and side view of part of the said mechanism; and Fig. 5 shows a modification of the feeding and measuring devices.

Referring to the form of my invention shown in the drawings, 1 represents a glass furnace and 2 the molten glass therein. The furnace is provided, as shown in Figs. 2 and 5, with a discharge chamber 3, whose floor 4 is raised above the level of the floor 5 of the main part of the furnace.

6 is a boot of ordinary construction to prevent the scum on the surface of the molten glass in the main part of the furnace from passing into the discharge chamber. The floor 4 of the discharge chamber is provided with an orifice 7, preferably beveled, as shown, for the better seating upon it of a valve 8. This valve controls the discharge of the molten glass from the furnace, and this valve may be raised from its seat or lowered upon it by any suitable means. As shown in Figs. 1 and 2, it is raised and lowered by the following described mechanism. The rod 9 which carries valve 8 is pivotally secured at 10 to lever 11, fulcrumed at 12 and provided at its other end with a rod 13 carrying a roller 14 which runs upon a cam 15, mounted on shaft 16, fingers 17 of rod 13 embracing the shaft, as shown in Fig. 2, in the ordinary manner. Shaft 16 is driven from pulley 18, from which power is imparted from any suitable source, through gear 19, mounted on the same shaft 20 which carries pulley 18, gear 21, turning on stud 22 and meshing with gear 19, and gear 23 on shaft 16. By these means, valve 8 is automatically controlled and is opened the proper distance and kept open just the exact length of time necessary to permit the desired amount of molten glass to escape from the furnace. By changing the speed of the driving parts, or by adjusting the gearing, the amount of discharge can be accurately adjusted. I also prefer to make valve 8 adjustable upon rod 9, as by means of screw-threads, as shown in Fig. 2, in order to furnish an additional means of adjustment. Valve 8 is provided with beveled surfaces to seat upon the beveled surfaces of orifice 7, as shown in Fig. 2.

26 is a burner of any suitable construction for throwing a jet of flame through orifice 27 upon the glass in the discharge chamber to keep it at the proper temperature at the point of discharge.

I provide means for automatically delivering the molten glass as it is discharged from the furnace. In the apparatus shown the glass is delivered to molds 42 for making glass insulators in a press 45 for that purpose. The details of this press are not shown, as they form no part of the present invention.

For the purpose of such automatic delivery and discharge, I preferably provide a rotating receiver 28 adapted to receive the molten glass and remove it from the point of discharge from the furnace so that it may be delivered to the molds. In the form shown, the receiver is provided with a plurality of dished surfaces 29, each provided with bounding side walls 30. As shown, the receiver is mounted integral with shaft 31 in sleeves or bearings 32 carried by the framework of the machine and shaft 31 is intermittently rotated through gear 33 and wheel 34, the latter having a segment 35, provided with gear teeth, as shown in Fig. 4. Gear 34 is mounted on shaft 20, and at each revolution rotates the receiver, in the form shown in the drawings, one-third of a rotation, bringing a new dished surface into place to receive another mass of molten glass.

In the form shown in Figs. 1–4 the receiving surface is locked into position after each one-third revolution. For this purpose, a disk 36 is mounted on shaft 31 provided with dished surfaces 37 corresponding to those of the receiver and a disk 38 is mounted on shaft 20 to engage the surfaces 37, as shown in Fig. 4. A part of the periphery of disk 38 is cut away as at 39. This cut-away portion is opposite to the toothed segment 35 of wheel 34, as shown in Fig. 4. This arrangement unlocks the receiver shaft at the time that gear 35 meshes with gear 33 and permits shaft 31 and the receiver with it to rotate one-third of a revolution.

The receiver may be composed of one or any number of receiving surfaces and may be of any desired form or construction. As shown, it is composed of three receiving surfaces. The interior of the receiver is preferably made hollow to receive a cooling medium 24 supplied to it through pipes 40 and the hollow interior of shaft 31. Unless the receiver is cooled, the molten glass is liable to stick to its surfaces.

The molten glass can be removed from the receiver for delivery to the molds by any suitable means. As shown in the drawings, I provide for this purpose a trough 41 placed so that at each one-third rotation of the receiver, the molten glass is emptied from one of the dished surfaces upon which it was fed, into the trough, and passes down through the trough into a mold 42. 43, in Fig. 2, is a mass of molten glass just passing into the mold. Trough 41 is cooled by any suitable cooling medium 24 through pipes 44 in order to prevent the sticking of the glass to its surface.

It is not essential to my broad invention that delivering mechanism be interposed between the rotating receiver and the mold, as for example, in cases where a mold is arranged to pass immediately beneath the receiver and to receive the separated masses directly from the receiver itself. I prefer, however, to insert some intermediate mechanism like the trough and its appurtenances above described.

It will be understood that the molten glass may be delivered to molds for forming any glass articles or may be delivered to any desired receptacle. In the drawings, as above stated, it is shown as delivered to molds mounted upon a turntable press for making glass insulators, the turntable being rotated in the ordinary way and by any suitable means to bring each mold in turn past trough 41. 46 represents an additional trough fixed to each mold or to the turntable in each mold to aid in carrying the molten glass from trough 41 into the mold proper.

Fig. 5 represents an arrangement in which valve 8 is adapted to be kept open during all the time the press is working and in which the glass is separated and measured by means of the rotating receiver alone and forms a longitudinal section through the receiver and a part of the furnace and trough. It is intended merely to illustrate, without giving all of the details and connections, the construction last above referred to. In this case, valve 8 can be opened and closed in any suitable way, as for instance by hand, or by in any way disconnecting rod 9 and valve 8 from their driving mechanism shown in Figs. 1–4. It is left open during the operation of the press. A steady stream of molten glass will, accordingly, flow down on the receiver. The receiver in such case will be rotated preferably continuously, and at such a speed that from the time one edge 53 of the dished surface passes the opening 7 in the furnace until another edge 53 of the same dished surface passes the said point, the exact amount of molten glass required for each insulator or other article will have flowed down through the opening upon the dished surface 29. A scraper 54, secured to the framework of the press in any suitable manner (not shown) is arranged near the top of the receiver in close proximity to the left hand end of opening 7, as seen in Figs. 2 and 5. This scraper is so arranged that it will press against each edge 53 and push or scrape the molten glass that may have fallen upon it back on to the next dished surface 29. Each mass of molten glass is emptied by its dished surface upon trough 41 in the manner already described.

Many modifications and departures from the particular form of devices shown in the drawings may, of course, be made without departing from my invention, the essentials of which are set forth in the claims appended hereto.

If desired, the valve 8 may be cooled by a cooling medium in the same manner as the receiver. It will be understood that, where the valve 8 is intermittently opened and closed and the receiver 28 is intermittently driven, the feeding and measuring devices, for feeding and separating the glass into masses of the desired amount, consist of valve 8, rod 9 and the means for opening and closing the valve and for timing such movement, taken in connection with receiver 28 and its driving parts. But where valve 8 is continuously left open and receiver 28 is continuously driven or rotated, the measuring devices, which separate the molten glass into masses of the desired amount, are not in contact in any way with the molten glass in the furnace but are entirely outside of the furnace. This is the form I prefer to use. In such form by varying the size of the discharge opening or the speed of the receiver, or both, the amount of each mass can be accurately adjusted.

I am aware that attempts have been made to automatically feed molten glass from a furnace and to separate the glass into masses of the desired amount, but all such attempts, so far as I know or am informed, have been failures, because the separating devices have come into contact with the molten glass in the furnace. Such contact rapidly heats the metallic surfaces of the separating devices causing the molten glass to stick to them and to clog the passages and stop the apparatus and render it wholly useless. On the other hand, any attempt to cool such separating devices tends to chill the molten glass at the point of its discharge from the furnace and soon clogs the discharge orifice and wholly stops the flow of the glass. These troubles are completely overcome by my improved device. By their use, in their preferred form, the separating means can be properly cooled without effecting in any way the discharge of the molten glass from the furnace, as they are not in contact in any way with the molten glass in the furnace or at the point of discharge, and thereby all trouble, heretofore encountered in automatically feeding and separating glass, is effectually overcome.

By means of my improvement, the amount of molten glass supplied in each instance is accurately and with certainty determined; the feed can be adjusted easily, accurately, and with certainty in order to vary the amount of glass supplied from the furnace; the feeding and measuring may be made automatic; the cost of making glass articles, such as insulators, is materially reduced, and such articles themselves are made of better appearance and more perfect form.

This present application is a divisional application of my application, Serial No. 82,368, filed November 15th, 1901, for an improvement in apparatus for making glass insulators or other glass articles.

What I claim as new and desire to secure by Letters Patent is:

1. The combination of a furnace for molten glass provided with a discharge chamber having its floor raised above the level of the floor of the main part of the furnace, an orifice in one of the walls of the discharge chamber for the discharge of the glass, and a valve for said orifice to control the discharge of molten glass therefrom.

2. The combination of a furnace for molten glass provided with a discharge chamber having its floor raised above the level of the floor of the main part of the furnace, an orifice in the floor of the discharge chamber for the discharge of the glass, a valve for said orifice to control the discharge of the molten glass therefrom, and a boot separating the discharge chamber from the main part of the furnace.

3. The combination with a furnace provided with an orifice for the discharge of molten glass, of a trough for conveying the molten glass to the point of delivery provided with a hollow space or chamber, and means for supplying a cooling medium to such space or chamber, whereby the sticking of the molten glass to the surface of the trough will be prevented.

4. In a machine for making glass insulators or other similar small glass articles the combination of a furnace for molten glass, devices for feeding the molten glass in a stream from the furnace means for heating the glass to keep it at the proper temperature at the point of discharge and for separating the stream of glass into masses of the desired amount.

5. In a machine for making glass insulators or other similar small glass articles the combination of a furnace for molten glass, devices for feeding the molten glass in a stream from the furnace means for heating the glass to keep it at the proper temperature at the point of discharge, and measuring devices, not in contact with the molten glass in the furnace, upon which the stream of glass is adapted to fall, for separating the glass into masses of the desired amount.

6. In a machine for making glass insulators or other similar small glass articles the combination of a furnace for molten glass, an orifice for the discharge of the glass therefrom means for heating the glass to keep it at the proper temperature at the point of discharge, measuring devices, not in contact with the molten glass in the furnace, for separating the glass into masses of the desired amount, and means automatically actuated for operating the measuring devices.

7. In a machine for making glass insulators or other similar small glass articles the combination of a furnace for molten glass, an orifice for the discharge of the molten glass therefrom means for heating the glass to keep it at the proper temperature at the point of discharge, and a receiver not in contact with the molten glass in the furnace, adapted to receive the glass as discharged therefrom and to separate it into masses of the desired amount, and to deliver each mass separately.

8. In a machine for making glass insulators or other similar small glass articles the combination of a furnace for molten glass, devices for feeding the glass in a stream means for heating the glass to keep it at the proper temperature at the point of discharge therefrom, a rotating receiver, provided with one or more dished surfaces, adapted to receive the stream of glass as discharged from the furnace and to separate it into masses of the desired amount, and a scraper adapted to make contact with the edges of the dished surfaces, as the receiver rotates, to hold back any excess of molten glass.

9. The combination of a furnace for molten glass, means for feeding the glass and separating it into masses of the desired amount, a trough for receiving each mass separately and conveying it to the point of delivery, said trough provided with a hollow space or chamber, and means for supplying cooling medium to such space, whereby the sticking of the molten glass to the surfaces of the trough will be prevented.

10. In a machine for making glass insulators or other similar small glass articles the combination of a furnace for molten glass, an orifice for the discharge of the molten glass therefrom means for heating the glass to keep it at the proper temperature at the point of discharge, a measuring device for separating the glass into masses of the desired amount and means for cooling said measuring device.

11. In a machine for making glass insulators or other similar small glass articles the combination of a furnace for molten glass, an orifice for the discharge of the molten glass therefrom means for heating the glass to keep it at the proper temperature at the point of discharge, a measuring device not in contact with the molten glass in the furnace for separating the glass into masses of the desired amount, and means for cooling said measuring device.

12. In a glass measuring and delivering apparatus, the combination with a melting pot and a chambered extension thereof adapted to contain molten glass and having a discharge orifice, a rotatable carrier journaled beneath said extension, receptacles on said carrier registrable successively with said orifice and means within the chamber and operating through said discharge orifice for aiding the feed to said receptacle.

13. In combination with a receptacle for molten glass, an outlet therefrom, means for opening and closing said outlet, means for maintaining the outlet at a high temperature and means for preventing the formation of a thread from the charge of falling glass delivered from said outlet.

14. In a device for delivering measured quantities of molten glass from a receptacle, an outlet from the receptacle, means for opening and closing said outlet at predetermined times and to a predetermined extent, and means for directing the glass falling from said outlet to a central position in the receptacle to which the measured quantity of glass is to be delivered.

15. In a device for intermittently delivering molten glass from a receptacle, an outlet from the receptacle, a gate for closing and opening said outlet, means for maintaining the outlet and gate at a high temperature, means for opening and closing said gate, means for maintaining the glass flowing from said outlet at a high temperature, and means for preventing the formation of a thread from the glass falling from the outlet upon the closure of the gate.

16. In a device for intermittently delivering molten glass from a receptacle, an outlet for the glass, and gas jets for severing the thread tending to form from the charge of glass delivered from the outlet.

17. In a device for intermittently delivering molten glass from a receptacle, an outlet through which glass may flow from the receptacle, a gate normally closing said outlet, positively acting mechanism for opening the gate and means for permitting said gate to close without positively actuating it.

In testimony whereof, I have signed my name to this specification, in the presence of two subscribing witnesses.

HENRY M. BROOKFIELD.

Witnesses:
 EDWIN SEGER,
 JOHN O. GEMPLER.